(12) United States Patent
Miyanagi et al.

(10) Patent No.: US 8,605,344 B2
(45) Date of Patent: Dec. 10, 2013

(54) OPTICAL REFLECTING MIRROR, AND OPTICAL SCANNER AND IMAGE FORMING APPARATUS INCLUDING SAME

(75) Inventors: Hideto Miyanagi, Osaka (JP); Kousuke Uchida, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 660 days.

(21) Appl. No.: 12/473,845

(22) Filed: May 28, 2009

(65) Prior Publication Data
US 2010/0033775 A1 Feb. 11, 2010

(30) Foreign Application Priority Data

Aug. 5, 2008 (JP) ................................ 2008-201555

(51) Int. Cl.
*H04N 1/46* (2006.01)
*G02B 17/06* (2006.01)
*H04N 1/113* (2006.01)
*G02B 26/10* (2006.01)

(52) U.S. Cl.
CPC .......... *G02B 17/0621* (2013.01); *H04N 1/1135* (2013.01); *G02B 26/10* (2013.01)
USPC ........... 358/505; 358/510; 358/511; 358/481; 358/484

(58) Field of Classification Search
USPC ......... 358/494, 496, 509, 510, 511, 481, 527, 358/530, 484, 493
See application file for complete search history.

(56) References Cited

U.S. PATENT DOCUMENTS

| | | | |
|---|---|---|---|
| 6,404,530 B1 | 6/2002 | Takeuchi | |
| 2005/0057636 A1* | 3/2005 | Mori | 347/140 |
| 2006/0237638 A1* | 10/2006 | Lee | 250/234 |
| 2010/0110517 A1* | 5/2010 | Shikii et al. | 359/207.1 |

FOREIGN PATENT DOCUMENTS

| | | |
|---|---|---|
| JP | 57-062002 | 4/1982 |
| JP | 10-282399 | 10/1998 |

* cited by examiner

*Primary Examiner* — Jerome Grant, II
(74) *Attorney, Agent, or Firm* — K&L Gates LLP

(57) ABSTRACT

A rectangular plate optical reflecting mirror is provided in an optical scanner. The optical reflecting mirror reflects an optical beam onto a surface to be scanned. The optical reflecting mirror includes a center portion and end portions in a longitudinal direction. The center portion has a greater thickness than that of the end portions. Accordingly, rigidity of the optical reflecting mirror can be increased, and its characteristic frequency can be set at a high value. Thus, resonance of the optical reflecting mirror can be prevented from occurring as a result of vibration of a housing which vibrates with a plurality of vibration modes.

4 Claims, 7 Drawing Sheets

OPTICAL REFLECTING MIRROR, AND OPTICAL SCANNER AND IMAGE FORMING APPARATUS INCLUDING SAME

INCORPORATION BY REFERENCE

This application is based upon and claims the benefit of priority from the corresponding Japanese Patent application No. 2008-201555 filed Aug. 5, 2008, the entire contents of which are incorporated herein by reference.

BACKGROUND

1. Field of the Invention

The present invention relates to a rectangular plate optical reflecting mirror in an optical scanner mounted on an image forming apparatus, such as a copier, a printer, or a facsimile. The optical scanner exposes a surface of an image bearing member with an optical beam (for example, laser beam) and scans the surface with the optical beam, the optical reflecting mirror reflecting the optical beam to guide the optical beam onto a surface to be scanned. Also, the present invention relates to the optical scanner and the image forming apparatus including the optical reflecting mirror.

2. Description of the Related Art

Typically, an optical scanner that is used in a copier or a printer exposes a surface of an image bearing member, for example, a photosensitive drum or a surface to be scanned, to light while scanning the surface, and forms a predetermined electrostatic latent image on the surface of the photosensitive drum. In the optical scanner, an optical beam, for example, a laser beam, emitted from a light source is deflected by an optical deflector in a main-scanning direction, and is sent to the surface to be scanned by an optical system member such as a optical reflecting mirror.

More specifically, typically, the optical scanner includes a light source such as a laser diode. The laser beam emitted from the light source is incident on a polygonal mirror serving as the optical deflector. The polygonal mirror reflects the laser beam using a reflection surface, and deflects the laser beam in the main-scanning direction. The laser beam that is deflected in the main-scanning direction is deflected at a uniform velocity by an fθ lens so as to be parallel to an axial direction of the photosensitive drum. The deflected laser beam is sent to the surface of the photosensitive drum via the optical reflecting mirror and an image is formed on the surface.

In recent years, image forming apparatuses capable of high-speed printing have markedly spread. The optical scanner has to operate to meet the performance of these image forming apparatus. Thus, the polygonal mirror has to rotate at higher speeds. Accordingly, vibrations are likely to occur at positions around the optical deflector in the optical scanner. Also, vibrations can result from the high-speed printing and occur at another position in the image forming apparatus and propagate to the optical scanner. Thus, the optical scanner mounted on the image forming apparatus has a greater likelihood of vibrating due to a plurality of vibration modes.

The vibrations occurring in the optical scanner or propagating to the optical scanner may reach the optical member, for example, the lens or the optical reflecting mirror. In particular, when the optical reflecting mirror vibrates, it is difficult to maintain the predetermined position and angle of the optical reflecting mirror. Accordingly, the optical axis of the optical beam may shift. As a result, the electrostatic latent image formed on the surface of the photosensitive drum may be adversely affected, thereby resulting in reduced image quality.

In light of this situation, to address the problems, various methods have been suggested to prevent the optical reflecting mirror from vibrating. Japanese Unexamined Patent Application Publication No. 10-282399 discloses an example of such methods. An optical reflecting mirror disclosed in the above publication includes a reinforcement member bonded to one or both side surfaces extending in a longitudinal direction.

Since the optical reflecting mirror disclosed in the publication includes the reinforcement member bonded to one or both surfaces extending in the longitudinal direction, this results in an increase in the weight and rigidity of the optical reflecting mirror. Thus, vibration of the optical reflecting mirror is decreased, and it reduces a defect from occurring as a result of a reduction in the flatness of the optical reflecting mirror. However, using a method wherein a characteristic frequency is reduced by increasing the weight of the optical reflecting mirror, such as in the above method, the vibration of the optical scanner with the plurality of vibration modes is not reduced. The optical reflecting mirror may resonate. Due to this, an image defect such as a lateral stripe may appear, and this may reduce the image quality.

Also, using a method such as bonding the reinforcement member to the optical reflecting mirror, may impact the flatness of the reflecting mirror due to the material characteristic of the reinforcement member. In this regard, the flatness of the optical reflecting mirror may be determined in view of the flatness of the reinforcement member, or the optical reflecting mirror may be deformed when the reinforcement member is deformed due to changes in temperature and humidity. Accordingly, an image defect such as curvature of field may appear, and this may reduce the image quality. Accordingly, image formation with high image quality may not be provided.

In light of the above, an advantage of the present invention is to provide a rectangular plate optical reflecting mirror which reflects an optical beam to guide the optical beam onto a surface to be scanned, the optical reflecting mirror having a rigidity that eliminates the necessity of using a reinforcement member, the reinforcement member being likely affected by material characteristic, capable of preventing resonance from occurring as a result of vibration with a plurality of vibration modes and capable of providing a high-quality image. Another advantage of the present invention is to provide an optical scanner and an image forming apparatus including the optical reflecting mirror.

SUMMARY

In accordance with an embodiment of the present invention a rectangular plate optical reflecting mirror is provided which reflects an optical beam onto a surface to be scanned. The optical reflecting mirror includes a center portion and end portions in a longitudinal direction. The center portion reflects the optical beam. The end portions are supported by a housing. The center portion has a greater thickness than that of both end portions.

Preferably, in the optical reflecting mirror, the center portion may protrude at a rear surface opposite to a reflection surface extending in the longitudinal direction, with respect to the both end portions.

Preferably, in the optical reflecting mirror, in the center portion and the end portions, a rear surface opposite to a reflection surface may extend parallel to the reflection surface, and step portions may be provided between the center portion and the end portions.

Preferably, in the optical reflecting mirror, inclined surfaces may be provided at positions of the step portions such that the inclined surfaces extend to connect a flat surface of the center portion with flat surfaces of the end portions.

Alternatively, in the optical reflecting mirror, curved surfaces may be provided at corners of the step portions.

Preferably, in the optical reflecting mirror, the end portions may be formed by cutting, such that the thickness of the end portions is smaller than the thickness of the center portion.

According to another embodiment of the present invention, an optical scanner is provided. The optical scanner includes a light source which emits an optical beam, an optical deflector which deflects the optical beam in a main-scanning direction, and a optical reflecting mirror which reflects the optical beam toward a surface to be scanned. The optical reflecting mirror includes a center portion and both end portions in a longitudinal direction. The center portion reflects the optical beam. The end portions are supported by a housing. The center portion has a greater thickness than that of the end portions.

According to still another embodiment of the invention, an image forming apparatus is provided. The image forming apparatus includes an optical scanner. The optical scanner includes a light source which emits an optical beam, an optical deflector which deflects the optical beam in a main-scanning direction, and a optical reflecting mirror which reflects the optical beam toward a surface to be scanned. The optical reflecting mirror includes a center portion and end portions in a longitudinal direction. The center portion reflects the optical beam. The end portions are supported by a housing. The center portion has a greater thickness than that of both end portions.

The optical scanner includes the optical reflecting mirror and the image forming apparatus includes the optical scanner. Accordingly, high-performance optical scanner and image forming apparatus capable of providing high-quality images can be provided.

Additional features and advantages are described herein, and will be apparent from the following Detailed Description and the figures.

DETAILED DESCRIPTION

Embodiments of the present invention will be described below with reference to FIGS. 1 to 7.

Figure 1:
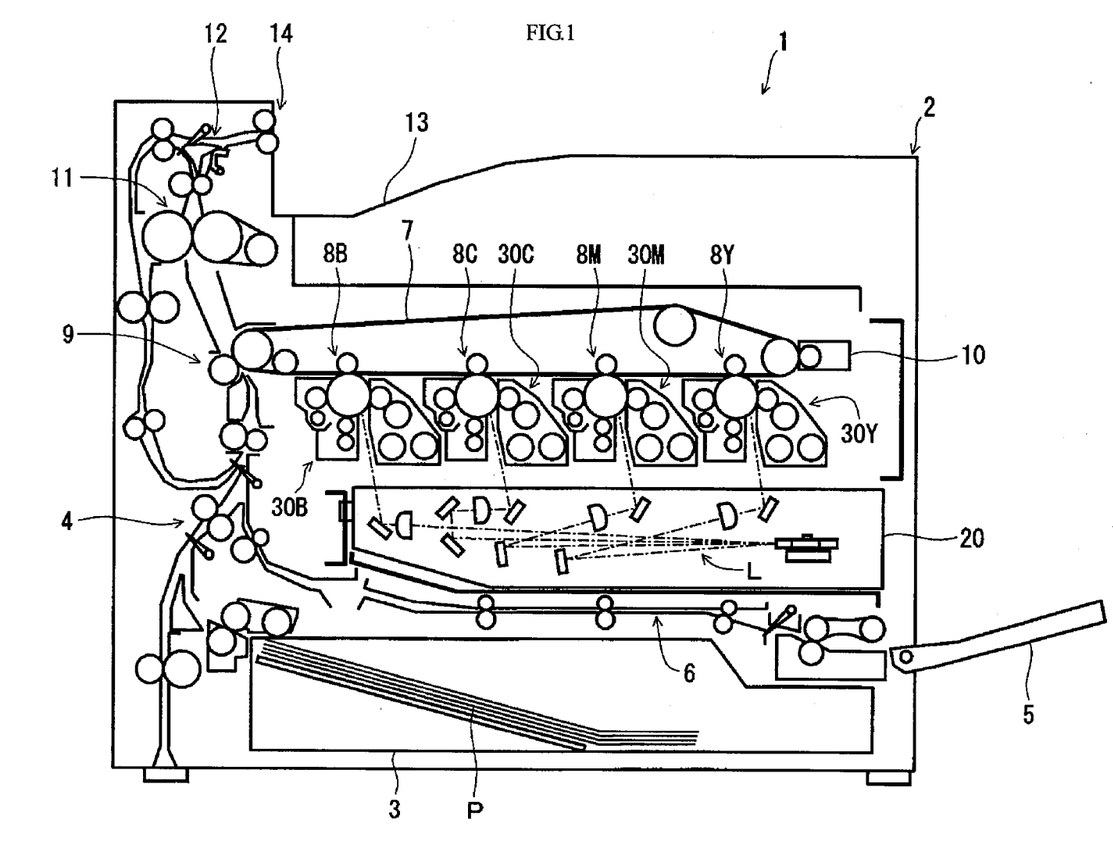
FIG. 1 is a front view of a vertical section schematically showing an image forming apparatus including an optical scanner including an optical reflecting mirror according to an embodiment of the present invention.

An image forming apparatus including an optical scanner including a optical reflecting mirror according to an embodiment of the invention will be described. In particular, a brief structure and an image output operation of the image forming apparatus is described with reference to FIG. 1. FIG. 1 is a front view of a vertical section schematically showing the image forming apparatus. The image forming apparatus is a color print type in which a toner image is transferred onto a sheet by an intermediate transfer belt.

Referring to FIG. 1, a sheet feed cassette 3 is located at a lower position in a main body 2 of an image forming apparatus 1. In the sheet feed cassette 3, sheets P such as cut paper, before printing, are stacked. The sheets P are separated and fed one at a time to an upper left side (FIG. 1) of the sheet feed cassette 3. The sheet feed cassette 3 can be horizontally pulled out from a front surface of the main body 2.

A first sheet conveying portion 4 is provided in the main body 2 at a left side of the sheet feed cassette 3. The first sheet conveying portion 4 extends substantially vertically along a left surface of the main body 2. The first sheet conveying portion 4 receives a sheet P fed from the sheet feed cassette 3, and feeds the sheet P toward a vertically upper side along the left surface of the main body 2 to a secondary transfer portion 9.

A manual sheet feed portion 5 is located above the sheet feed cassette 3 at a right surface of the main body 2, the right surface being opposite to the left surface along which the first sheet conveying portion 4 extends. Sheets having a type that is not suitable for storage in the sheet feed cassette 3, e.g., heavy sheets or OHP sheets, which are manually fed one by one, are stacked on the manual sheet feed portion 5.

A second sheet conveying portion 6 is located at a left side of the manual sheet feed portion 5. The second sheet conveying portion 6 is located directly above the sheet feed cassette 3, substantially horizontally extends from the manual sheet feed portion 5 to the first sheet conveying portion 4, and meets the first sheet conveying portion 4. The second sheet conveying portion 6 receives a sheet P or the like fed from the manual sheet feed portion 5, and feeds the sheet P substantially horizontally to the first sheet conveying portion 4.

The image forming apparatus 1 receives original image data from an external computer (not shown). Information with respect to the image data is sent to an optical scanner 20 located above the second sheet conveying portion 6 and which serves as exposure means. With the optical scanner 20, a laser beam L which is controlled in accordance with the image data is emitted to image forming units 30.

Four image forming units 30 are provided above the optical scanner 20. An intermediate transfer belt 7 is provided above the image forming units 30. The intermediate transfer belt 7 is an endless belt formed of an intermediate transfer member. The intermediate transfer belt 7 is wound around and supported by a plurality of rollers. The intermediate transfer belt 7 is rotated clockwise (FIG. 1) by a driver (not shown).

Referring to FIG. 1, the four image forming units 30 are arranged in a so-called tandem form in which the image forming units 30 are located in a rotation direction of the intermediate transfer belt 7, in a line from the upstream side to the downstream side in the rotation direction. The four image forming units 30 include: a yellow image forming unit 30Y; a magenta image forming unit 30M; a cyan image forming unit 30C; and a black image forming unit 30B in that order from the upstream side. The image forming units 30 are respectively supplied with developing agents (toners) by conveying means (not shown) from developing agent supply containers of the respective colors. In the following description, reference characters "Y", "M", "C", and "B" are omitted unless these colors have to be particularly set forth.

Each image forming unit 30 forms an electrostatic latent image of an original image with a laser beam L emitted by the optical scanner 20 serving as the exposure means. A toner image is developed from this electrostatic latent image. The toner image is primarily transferred on a surface of the intermediate transfer belt 7 at a primary transfer portion 8 provided above each image forming unit 30. When the intermediate transfer belt 7 rotates, the toner image of each image forming unit 30 is transferred on the intermediate transfer belt 7 at a predetermined time. Accordingly, a color toner image, in which toner images of the four colors of yellow, magenta, cyan, and black are superposed on each other, is formed on the surface of the intermediate transfer belt 7.

The secondary transfer portion 9 is located at a position at which the intermediate transfer belt 7 reaches a sheet conveying path. The color toner image on the surface of the intermediate transfer belt 7 is transferred onto the sheet P at a secondary transfer nip portion provided at the secondary transfer portion 9. The sheet P is fed by the first sheet conveying portion 4 so as to be synchronized with the secondary transfer operation.

After the secondary transfer operation, any residue substances such as toner remaining on the surface of the intermediate transfer belt 7 is cleaned up and recovered by a cleaner 10 for the intermediate transfer belt 7. The cleaner 10 is located at a position upstream of the yellow image forming unit 30Y in the rotation direction, for the intermediate transfer belt 7.

A fixer 11 is provided above the secondary transfer portion 9. The sheet P which has an unfixed toner image at the secondary transfer portion 9 is sent to the fixer 11. The toner image is fixed at the fixer 11 by heating and pressing the toner image with a heat roller and a pressure roller.

A separator 12 is provided above the fixer 11. The sheet P ejected from the fixer 11 is ejected to a sheet ejection portion 13 provided at an upper part of the image forming apparatus 1 through the separator 12 when duplex printing is not performed.

An ejection port portion, through which the sheet P is ejected from the separator 12 to the sheet ejection portion 13, functions as a switchback portion 14. When duplex printing is performed, the conveyance direction of the sheet P ejected from the fixer 11 is changed at the switchback portion 14. Then, the sheet P is fed through the separator 12, a left side of the fixer 11, and a left side of the secondary transfer portion 9 to a lower side, and is fed to the secondary transfer portion 9 again through the first sheet conveying portion 4.

Figure 2:
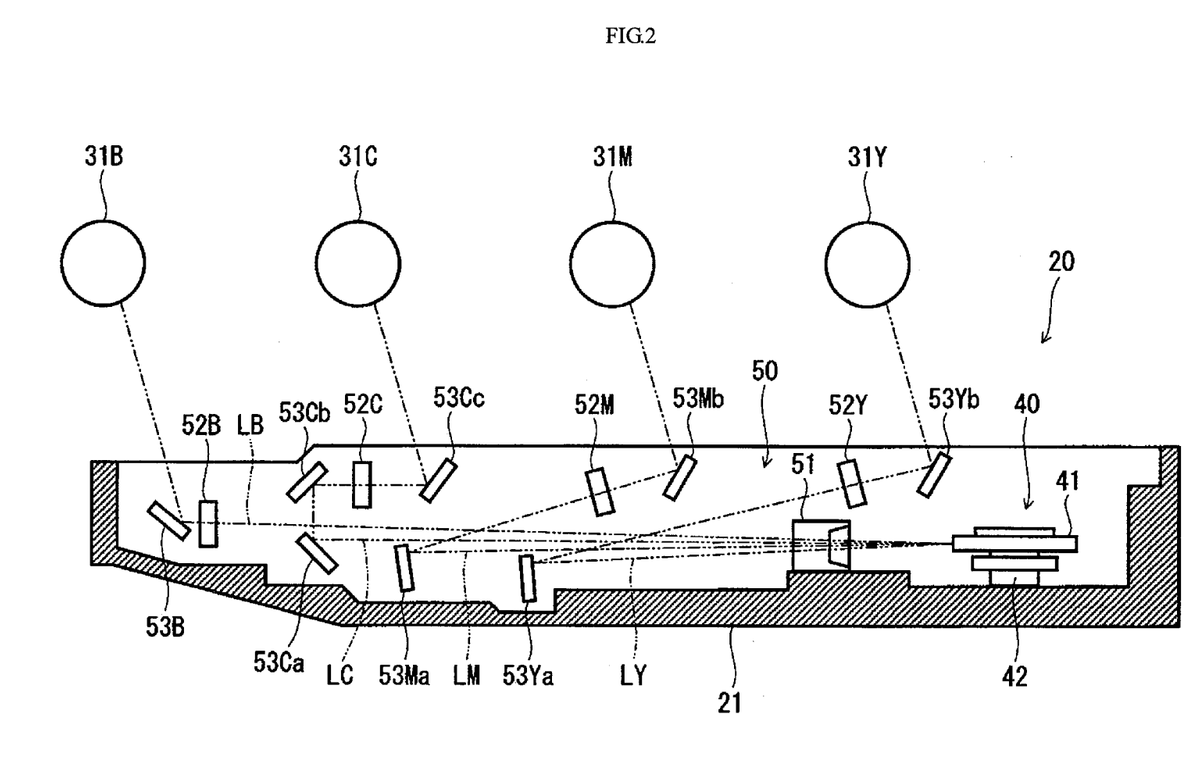
FIG. 2 is a front view of a vertical section schematically showing the optical scanner of FIG. 1.
Figure 3:
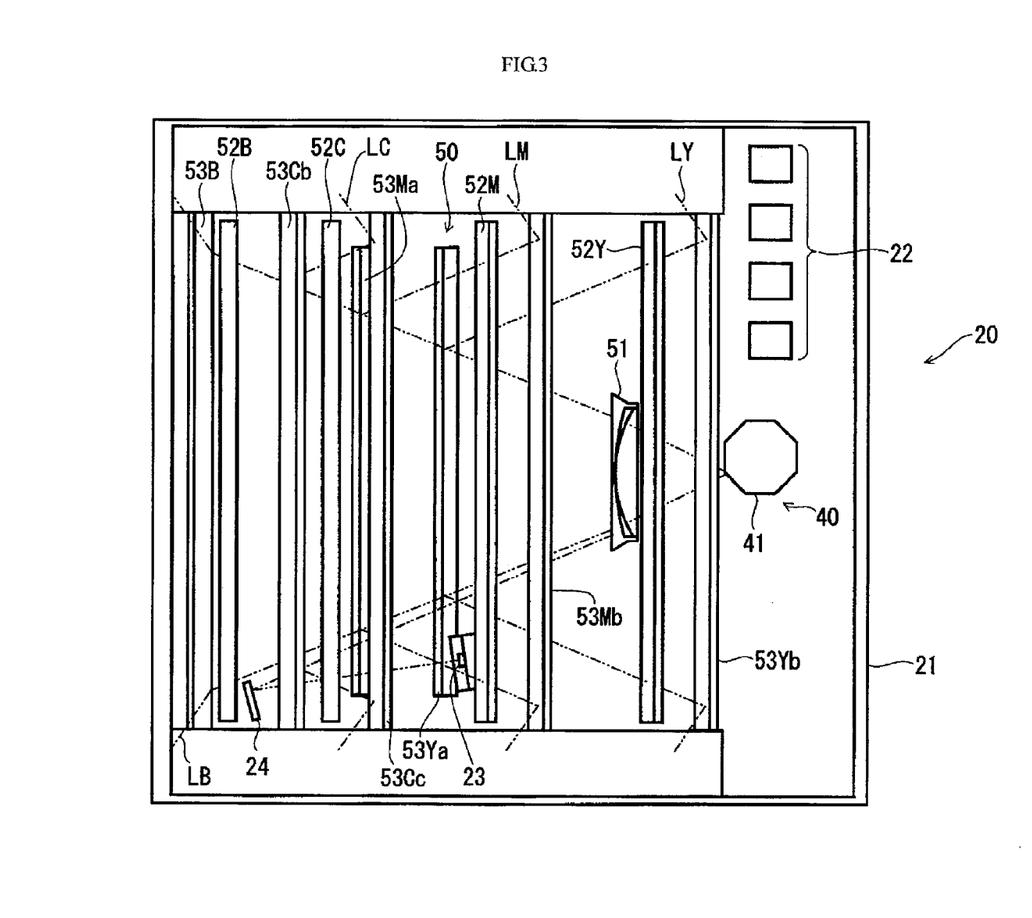
FIG. 3 is a top view schematically showing the optical scanner of FIG. 2.

Next, the structure of the optical scanner 20 of the image forming apparatus 1 will be described with reference to FIGS. 2 and 3. FIG. 2 is a front view of a vertical section schematically showing the optical scanner. FIG. 3 is a top view schematically showing the optical scanner.

As described above, the optical scanner 20 is designed to be mounted on the tandem image forming apparatus 1 including four photosensitive drums 31, respectively corresponding to the four colors: yellow; magenta; cyan; and black. Similar to the image forming units 30, some components of the optical scanner 20 have the reference characters of "Y", "M", "C", and "B" of the four colors. In the following description, however, these reference characters are occasionally omitted unless these colors have to be particularly set forth.

Referring to FIGS. 2 and 3, the optical scanner 20 includes a box-shaped housing 21 with an upper surface formed as an open part. An optical device is provided in the housing 21. The optical device includes a light source 22, an optical deflector 40, an optical system 50, and an optical sensor 23.

As shown in FIG. 3, the light source 22 is provided at one end of the housing 21. The optical scanner 20 corresponds to the four colors: yellow; magenta; cyan; and black. Hence, four light sources 22 for the respective colors are provided. Each light source 22 is a laser diode which emits an optical beam in a visible range, for example, a laser beam of about 670 nm.

The optical deflector 40 is provided near the light sources 22. The optical deflector 40 includes a polygonal mirror 41 and a motor 42. The motor 42 rotationally drives the polygonal mirror 41 around an axis extending in a vertical direction (FIG. 2). The polygonal mirror 41 has a regular polygonal shape with flat surfaces. The polygonal mirror 41, which rotates around the axis, has a plurality of reflection surfaces on the periphery thereof to reflect light.

Laser beams LY, LM, LC, and LB emitted from the four light sources 22 are incident on the reflection surfaces on the periphery of the polygonal mirror 41 at angles that are slightly different from each other in a sub-scanning direction (up-down direction in FIG. 2). The polygonal mirror 41 reflects the laser beams by the reflection surfaces while rotating, so as to deflect the laser beams in the main-scanning direction (left-right direction in FIG. 3) and to guide the laser beams to another end of the housing 21.

The optical system 50 is provided in the housing 21 in a region in which the laser beams reflected by the optical deflector 40 propagate. The optical system 50 includes a first fθ lens 51, second fθ lenses 52, and optical reflecting mirrors 53.

The first fθ lens 51 is located at a position at which the laser beams LY, LM, LC, and LB propagate immediately after the light beams LY, LM, LC, and LB are reflected by the optical deflector 40. The first fθ lens 51 is shared by the laser beams LY, LM, LC, and LB, and hence, a single first fθ lens 51 is provided. The first fθ lens 51 deflects the laser beams LY, LM, LC, and LB at a uniform velocity in the main-scanning direction. Further, the first fθ lens 51 slightly increases the angles of the laser beams LY, LM, LC, and LB in the sub-scanning direction while the incident angles of the laser beams LY, LM, LC, and LB to the polygonal mirror 41 and an adverse effect as a result of scanning, such as face tangle of the polygonal mirror 41, are corrected.

The yellow laser beam LY passing through the first fθ lens 51, is reflected by a optical reflecting mirror 53Ya located near an inner bottom surface of the housing 21, and turned toward the first fθ lens 51. Then, the laser beam LY passes through a second fθ lens 52Y, and is reflected by a optical reflecting mirror 53Yb arranged near an upper end of the housing 21, and reaches a surface of a yellow photosensitive drum 31Y which is the surface to be scanned, thereby forming an image on the surface.

The magenta laser beam LM passing through the first fθ lens 51, is reflected by a optical reflecting mirror 53Ya located near the inner bottom surface of the housing 21, and turned toward the first fθ lens 51, in a similar manner to the yellow laser beam LY. Then, the laser beam LM passes through a second fθ lens 52M, is reflected by a optical reflecting mirror 53Mb arranged near the upper end of the housing 21, and reaches a surface of a magenta photosensitive drum 31M which is the surface to be scanned, thereby forming an image on the surface.

The cyan laser beam LC passing through the first fθ lens 51, is reflected by a optical reflecting mirror 53Ca located near the inner bottom surface of the housing 21 substantially vertically upward, and then is reflected by a optical reflecting mirror 53Cb arranged near the upper end of the housing 21, and turned substantially horizontally toward the first fθ lens 51. Then, the laser beam LC passes through a second fθ lens 52C, is reflected by a optical reflecting mirror 53Cc, and reaches a surface of a cyan photosensitive drum 31C which is the surface to be scanned, thereby forming an image on the surface.

The black laser beam LB passing through the first fθ lens 51, directly passes through a second fθ lens 52B without being reflected by a optical reflecting mirror. Then, the laser beam LB is reflected by a optical reflecting mirror 53B, and reaches a surface of a black photosensitive drum 31B which is the surface to be scanned, thereby forming an image on the surface.

Referring to FIG. 3, the optical sensor 23 is located near the optical reflecting mirror 53Ya and the second fθ lens 52M, at a position near the outside in the main-scanning direction. The optical sensor 23 receives light outside an effective exposure area of the surface to be scanned, from among the laser beams reflected by the polygonal mirror 41 of the optical deflector 40. The laser beam received by the optical sensor 23 is reflected by a optical reflecting mirror 24 located near the second fθ lens 52B toward the optical sensor 23. The optical sensor 23 is a synchronism sensor for detecting scanning timings of the laser beams LY, LM, LC, and LB of the four colors. The optical sensor 23 is called a beam detect (BD) sensor.

Figure 4:
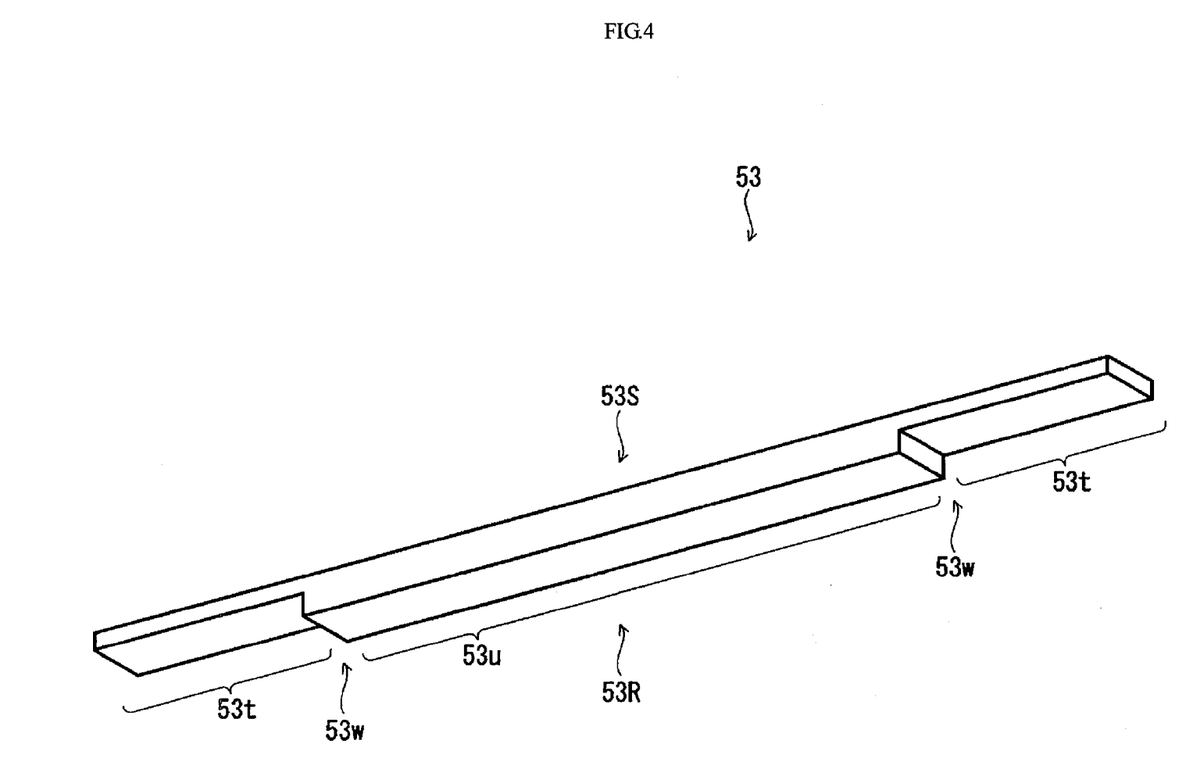
FIG. 4 is a perspective view showing the optical reflecting mirror of FIG. 3 viewed from a rear view opposite to a reflection surface.
Figure 5:
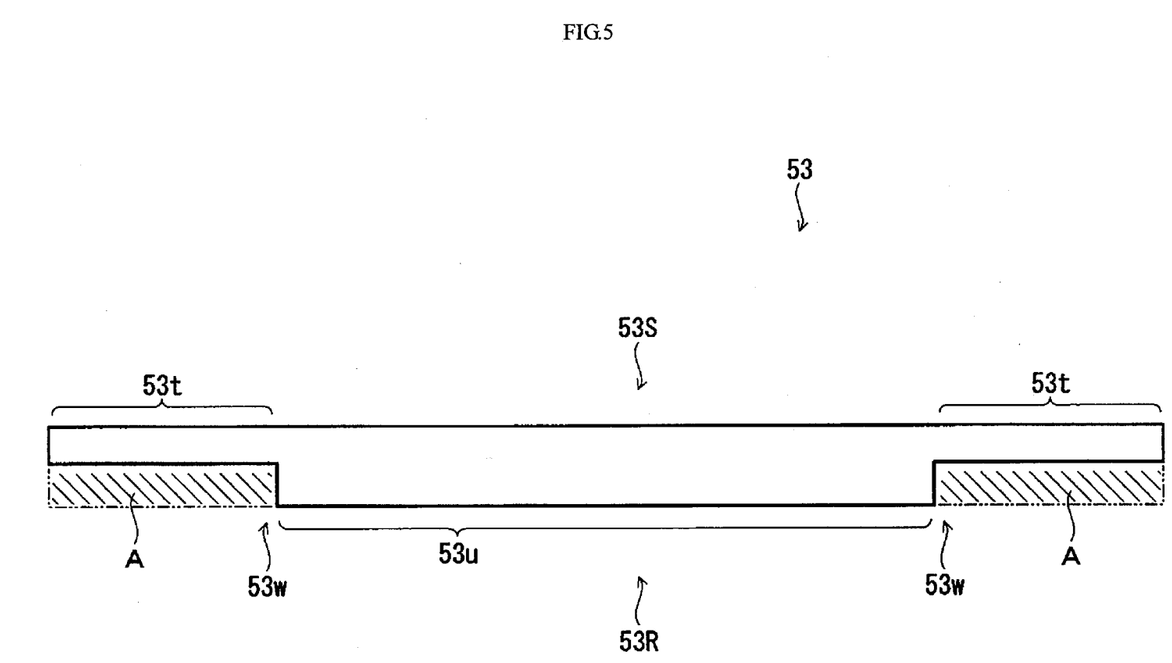
FIG. 5 is a top view showing the optical reflecting mirror of FIG. 4.

The structure of the optical reflecting mirrors 53 provided at the respective positions of the optical scanner 20 in the above-described configuration will be described with reference to FIGS. 4 and 5, in addition to FIGS. 2 and 3. FIG. 4 is a perspective view showing a optical reflecting mirror when viewed from a rear surface opposite to a reflection surface. FIG. 5 is a top view showing the optical reflecting mirror.

Each optical reflecting mirror 53 extends straight in the main-scanning direction as shown in FIGS. 2 and 3, and has a rectangular plate shape as shown in FIG. 4. Both end portions in the main scanning direction shown in FIGS. 4 and 5, that is, both end portions 53t in a longitudinal direction of the optical reflecting mirror 53 are supported by the housing 21.

A center portion 53u in the longitudinal direction of the optical reflecting mirror 53 has a greater thickness than that of the end portions 53t as shown in FIGS. 4 and 5. The center portion 53u has the greater thickness than that of the end portions 53t, at a rear surface 53R opposite to a reflection surface 53S extending in the longitudinal direction. In the center portion 53u and the end portions 53t, the rear surface 53R of the reflection surface 53S extends parallel to the reflection surface 53S, and step portions 53w are provided between the center portion 53u and the both end portions 53t.

Referring to FIG. 5, the end portions 53t of the optical reflecting mirror 53 are formed by cutting the optical reflecting mirror, which originally had the entire thickness of the center portion 53u, and removing only areas A at the both end portions 53t such that the end portions 53t become thinner than the center portion 53u.

In the rectangular plate optical reflecting mirror 53 which reflects the optical beam to guide the optical beam onto the surface to be scanned as described above, since the thickness of the center portion 53u is greater than the thickness of the both end portions 53t, the thickness of the center portion 53u can be increased as a single member without a reinforcement member being bonded to the optical reflecting mirror 53. Accordingly, the rigidity of the optical reflecting mirror 53 can be increased, and its characteristic frequency can be set at a high value. Thus, the optical reflecting mirror 53 can resist the vibration with a plurality of vibration modes, thereby preventing resonance of the optical reflecting mirror 53. Also, since no reinforcement member is bonded to the optical reflecting mirror 53, the flatness of the optical reflecting mirror 53 is not adversely affected by the material characteristics of other members. Accordingly, an optical reflecting mirror 53 can be provided, which is capable of preventing an image defect such as a lateral stripe or curvature of the field from appearing, and capable of providing a high-quality image.

Also, the thickness of the center portion 53u of the optical reflecting mirror 53 is greater than the end portions 53t at the rear surface 53R opposite to the reflection surface 53S extending in the longitudinal direction. Accordingly, the rigidity of the center portion 53u, which is an important portion for optical scanning, can be sufficiently increased while keeping the flatness of the reflection surface 53S of the optical reflecting mirror highly precisely. Thus, an optical reflecting mirror 53 which promotes an increase in image quality can be provided.

In the center portion 53u and the end portions 53t of the optical reflecting mirror 53, the rear surface 53R opposite to the reflection surface 53S extends parallel to the reflection surface 53S, and step portions 53w are provided between the center portion 53u and the end portions 53t. Accordingly, the center portion 53u having the greater thickness and the end portions 53t having the smaller thickness can be easily formed. Also, by adjusting the difference, the characteristic frequency of the optical reflecting mirror 53 can be changed as desired. Accordingly, an optical reflecting mirror 53 capable of effectively preventing resonance from occurring and capable of providing a high-quality image can be provided using a simple structure.

Further, since the end portions 53t are formed by cutting, so as to have a smaller thickness than that of the center portion 53u, various shapes can be provided depending on the manner of cutting. Accordingly, when the optical reflecting mirror 53 is formed, the shape can be easily finely adjusted in accordance with the flatness and the characteristic frequency of the reflection surface 53S. Thus, an optical reflecting mirror 53 having reflection surface 53S with high-precision flatness and capable of effectively preventing resonance from occurring can be provided using a relatively simple procedure.

Also, in this embodiment, since the optical reflecting mirror 53 is provided in the optical scanner 20, a high-performance optical scanner 20 can be provided, in which the optical reflecting mirror 53 has a rigidity that eliminates the necessity of using a reinforcement member, the reinforcement member likely being affected by the material characteristic, resonance can be prevented from occurring at the optical reflecting mirror 53 due to vibration of the housing vibrating with a plurality of vibration modes and a high-quality image can be provided.

Also, in this embodiment, since the optical reflecting mirror 53 is provided in the image forming apparatus 1, an image forming apparatus 1 can be provided, in which the optical reflecting mirror 53 of the optical scanner 20 has a rigidity that eliminates the necessity of using a reinforcement member, the reinforcement member being likely affected by the material characteristic, resonance can be prevented from occurring at the optical reflecting mirror 53 due to vibration of the housing vibrating with a plurality of vibration modes, and a high-quality image can be provided.

Figure 6:
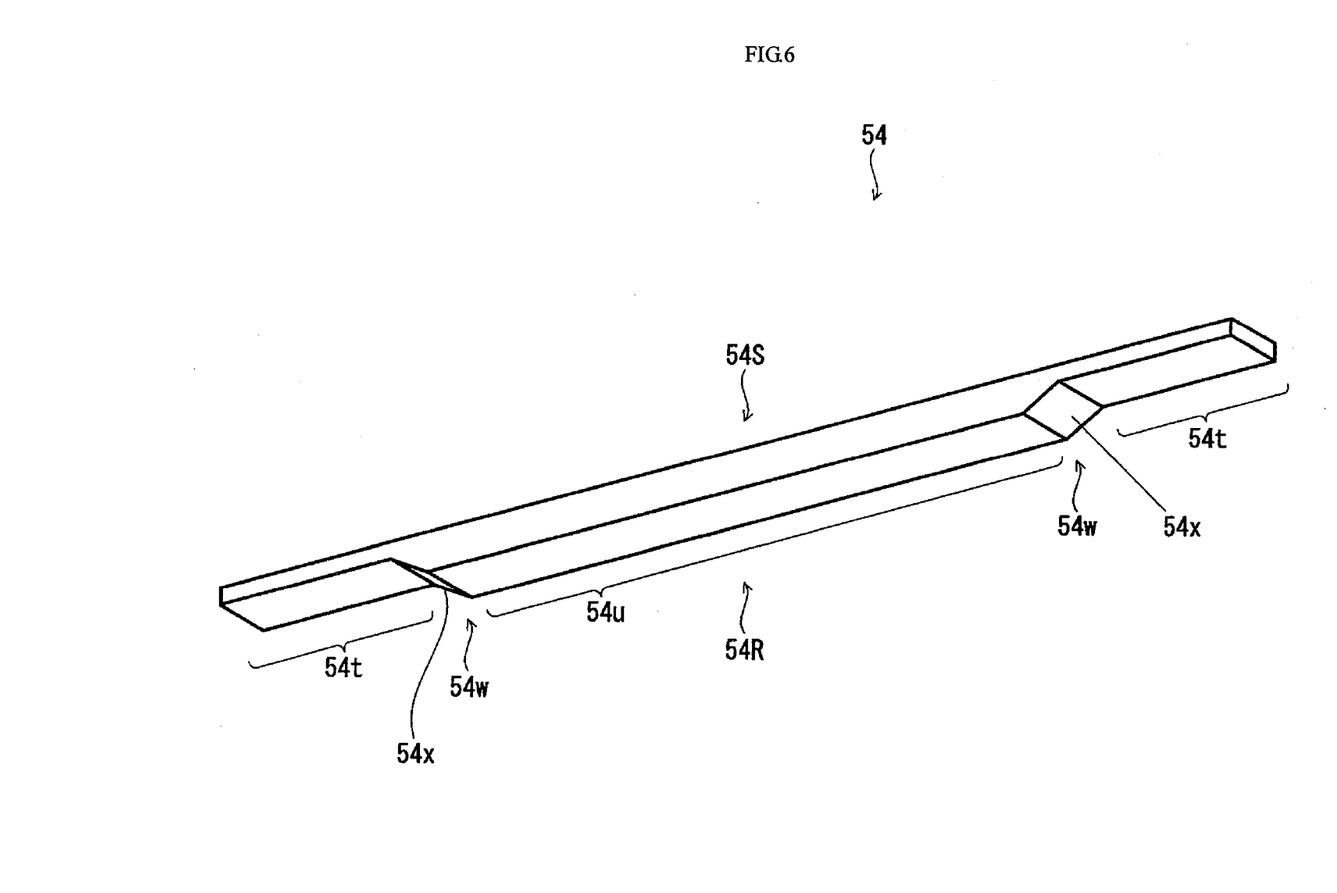
FIG. 6 is a perspective view showing a optical reflecting mirror according to another embodiment of the invention when viewed from a rear view opposite to a reflection surface.

Next, a optical reflecting mirror according to another embodiment of the present invention will be described with reference to FIG. 6. FIG. 6 is a perspective view showing the optical reflecting mirror when viewed from a rear surface opposite to a reflection surface. The basic structure of this embodiment is similar to that of the previous embodiment which has been described with reference to FIGS. 1 to 5. Hence, the same reference characters are used for the components that are common to that embodiment, and redundant descriptions will be omitted.

Referring to FIG. 6, a optical reflecting mirror 54, according to an embodiment, has inclined surfaces 54x at a rear surface 54R opposite to a reflection surface 54S, at positions of step portions 54w provided between a center portion 54u in a longitudinal direction and end portions 54t in the longitudinal direction.

The inclined surfaces 54x are provided at the positions of the step portions 54w such that the inclined surfaces 54x extend to smoothly connect a flat surface of the center portion 54u with flat surfaces of the end portions 54t. As a result, a concentration of stress that is likely to occur at the corners of the step portions 54w can be avoided. Hence, the flatness of the reflection surface 54S of the optical reflecting mirror 54 can be maintained. Thus, an optical reflecting mirror 54 can be provided, which is capable of effectively preventing an image defect such as curvature of the field from appearing and capable of providing a higher-quality image.

Figure 7:
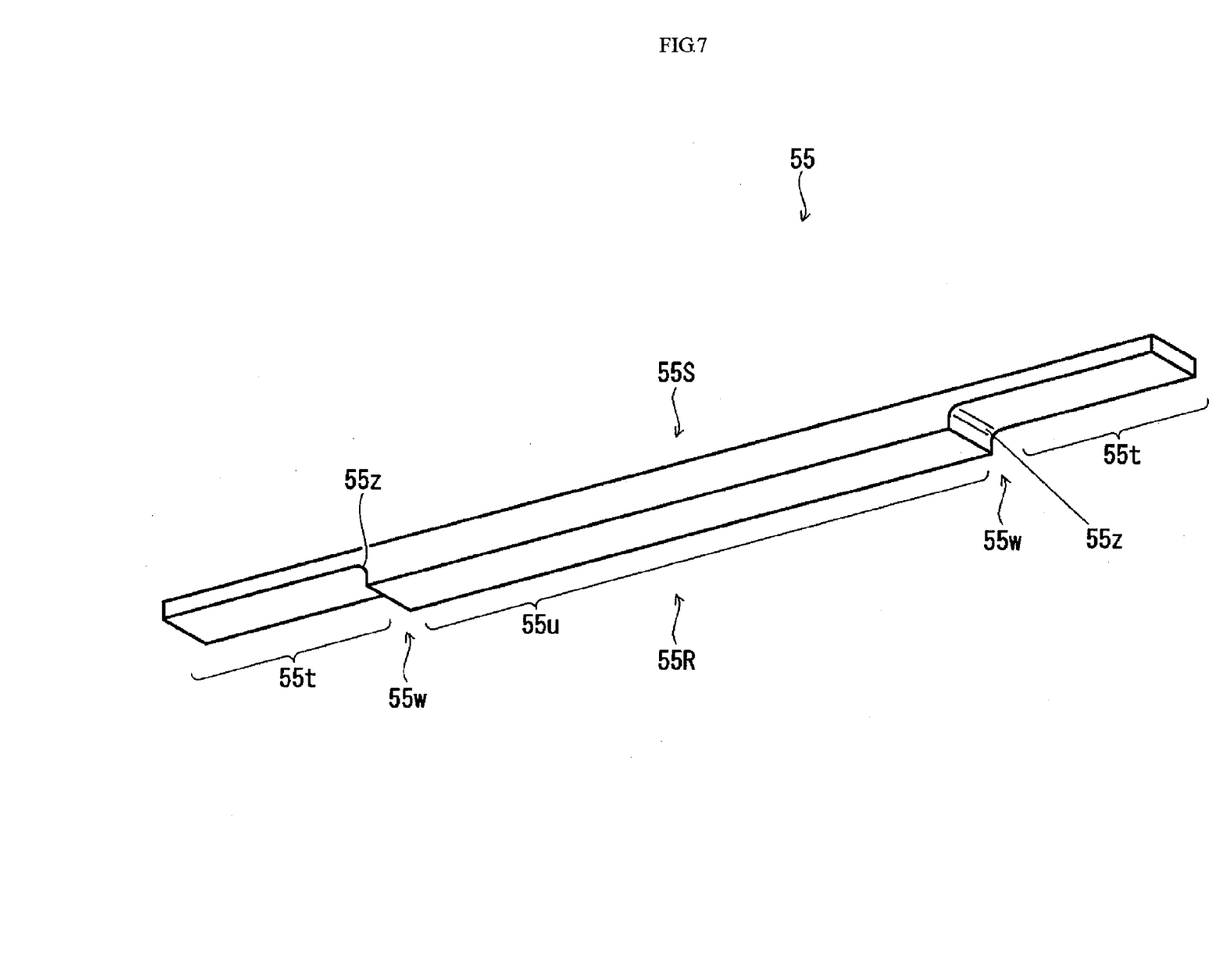
FIG. 7 is a perspective view showing a optical reflecting mirror according to a further embodiment of the invention when viewed from a rear view opposite to a reflection surface.

Next, a optical reflecting mirror according to a further embodiment of the present invention will be described with reference to FIG. 7. FIG. 7 is a perspective view showing the optical reflecting mirror when viewed from a rear surface opposite to a reflection surface. The basic structure of this embodiment is similar to that of the embodiment which has been described with reference to FIGS. 1 to 5. Hence, the same reference characters will be used for the components that are common to that embodiment, and redundant descriptions will be omitted.

Referring to FIG. 7, a optical reflecting mirror 55 according to an embodiment has curved surfaces 55z at a rear surface 55R opposite to a reflection surface 55S, at positions of step portions 55w provided between a center portion 55u in a longitudinal direction and end portions 55t in the longitudinal direction.

The curved surfaces 55z are provided in a curved manner at corner positions of the step portions 55w, i.e., positions at which flat surfaces of the end portions 55t are connected with flat surfaces orthogonal thereto such that the curved surfaces 55z extend to smoothly connect these flat surfaces with each other. As a result, a concentration of stress that is likely to occur at the corners of the step portions 55w can be avoided. In addition, an increase in weight of the optical reflecting mirror 55 can be prevented. Thus, the precision of the flatness of the reflection surface 55S of the optical reflecting mirror 55 can be prevented from being reduced. Further, the characteristic frequency can be set at a high value. Accordingly, an optical reflecting mirror 55 can be provided, which is capable of effectively preventing an image defect such as curvature of the field from appearing, capable of preventing resonance from occurring at the optical reflecting mirror 55 as a result of vibration of the housing with a plurality of vibration modes, and capable of promoting image formation with high quality.

While the optical scanner 20 is mounted on the tandem color-print image forming apparatus 1 including the plurality of image forming units 30 arranged in a line in the rotation direction of the intermediate transfer belt 7 and being capable of forming an image by superposing a plurality of colors in the above-described embodiments, the optical scanner 20 is not limited to being mounted on this type of image forming apparatus. For example, the optical scanner 20 can be mounted on a rotary-rack color-print image forming apparatus or a black-and-white image forming apparatus using only black toner.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A rectangular plate optical reflecting mirror which does not function as a lens and reflects an optical beam onto a surface to be scanned, comprising:
   a center portion in a longitudinal direction, the center portion reflecting the optical beam; and
   end portions in the longitudinal direction, the end portions supported by a housing, the center portion having a greater thickness than that of the end portions, wherein
   in the center portion and the end portions, a rear surface opposite to a reflection surface extends parallel to the reflection surface, and step portions are provided between the center portion and the end portions, and
   inclined surfaces are provided at the step portions, the inclined surfaces extend to connect a flat surface of the center portion with flat surfaces of the end portions.

2. The optical reflecting mirror according to claim 1, wherein the end portions are formed by cutting such that the thickness of the end portions is smaller than the thickness of the center portion.

3. An image forming apparatus comprising:
   an optical scanner, the optical scanner including
   a light source which emits an optical beam,
   an optical deflector which deflects the optical beam in a main-scanning direction,
   an optical reflecting mirror which does not function as a lens and reflects the optical beam toward a surface to be scanned, the optical reflecting mirror including a center portion in a longitudinal direction, the center portion reflecting the optical beam, end portions in the longitudinal direction, the end portions supported by a housing, and the center portion has a greater thickness than that of the end portions, wherein
   in the center portion and the end portions, a rear surface opposite to a reflection surface extends parallel to the reflection surface, and step portions are provided between the center portions and the end portions, and
   inclined surfaces are provided at the step portions, the inclined surfaces extend to connect a flat surface of the center portion with flat surfaces of the end portions.

4. A rectangular plate optical reflecting mirror which reflects an optical beam onto a surface to be scanned, comprising:
   a center portion in a longitudinal direction, the center portion reflecting the optical beam; and
   end portions in the longitudinal direction, the end portions supported by a housing, the center portion having a greater thickness than that of the end portions, wherein
   in the center portion and the end portions, a rear surface opposite to a reflection surface extends parallel to the reflection surface, and step portions are provided between the center portion and the end portions, and
   inclined surfaces are provided at the step portions, the inclined surfaces extend to connect a flat surface of the center portion with flat surfaces of the end portions.

* * * * *